US012597707B2

(12) United States Patent
Chang et al.

(10) Patent No.: US 12,597,707 B2
(45) Date of Patent: Apr. 7, 2026

(54) ANTENNA MODULE AND ELECTRONIC DEVICE

(71) Applicant: AUDEN TECHNO CORP., Taoyuan City (TW)

(72) Inventors: Chun-Hsien Chang, Kaohsiung City (TW); Yu-Tsung Huang, Taoyuan City (TW)

(73) Assignee: AUDEN TECHNO CORP., Taoyuan City (TW)

( * ) Notice: Subject to any disclaimer, the term of this patent is extended or adjusted under 35 U.S.C. 154(b) by 72 days.

(21) Appl. No.: 18/669,600

(22) Filed: May 21, 2024

(65) Prior Publication Data

US 2025/0364720 A1 Nov. 27, 2025

(51) Int. Cl.

*H01Q 9/42* (2006.01)
*H01Q 1/22* (2006.01)
*H01Q 5/357* (2015.01)
*H01Q 1/38* (2006.01)

(52) U.S. Cl.

CPC ........... *H01Q 5/357* (2015.01); *H01Q 1/2283* (2013.01); *H01Q 1/38* (2013.01)

(58) Field of Classification Search

CPC ......... H01Q 5/357; H01Q 1/2283; H01Q 1/38
See application file for complete search history.

(56) References Cited

U.S. PATENT DOCUMENTS

2009/0021448 A1* 1/2009 Tsai .......................... H01Q 1/38 343/893
2014/0253394 A1 9/2014 Nissinen et al.

FOREIGN PATENT DOCUMENTS

TW 202349789 A 12/2023

* cited by examiner

*Primary Examiner* — David E Lotter
(74) *Attorney, Agent, or Firm* — Li & Cai Intellectual Property (USA) Office

(57) ABSTRACT

An antenna module and an electronic device are provided. The antenna module includes a substrate, a floating radiating unit, a low-frequency radiating unit, and a feed unit. The substrate has a first and a second direction that are not parallel to each other. The floating radiating unit is spaced apart from the low-frequency radiating unit along the first direction, and the floating radiating unit and the low-frequency radiating unit have a common side in the second direction. The feed unit is located on the common side, and is spaced apart from the floating radiating unit and the low-frequency radiating unit along the second direction. A projection path of the feed unit along the second direction passes through the floating radiating unit and the low-frequency radiating unit, and the feed unit is coupled with the floating radiating unit and the low-frequency radiating unit.

8 Claims, 10 Drawing Sheets

ANTENNA MODULE AND ELECTRONIC DEVICE

FIELD OF THE DISCLOSURE

The present disclosure relates to an antenna module and an electronic device, and more particularly to an antenna module and an electronic device that can ensure maintenance of expected characteristics of a mid-frequency band when switching to a low-frequency band.

BACKGROUND OF THE DISCLOSURE

Conventional antenna modules have the function of adjusting a bandwidth, so as to accommodate various usage scenarios and product positioning requirements. For example, the conventional antenna modules can switch between a high-frequency band, a mid-frequency band, and a low-frequency band. However, when the conventional antenna modules switch to the low-frequency band, the characteristics of the mid-frequency band are easily disturbed, thereby resulting in unexpected changes in the characteristics of the mid-frequency band.

SUMMARY OF THE DISCLOSURE

In response to the above-referenced technical inadequacies, the present disclosure provides an antenna module and an electronic device.

In order to solve the above-mentioned problems, one of the technical aspects adopted by the present disclosure is to provide an antenna module. The antenna module includes a substrate, a floating radiating unit, a low-frequency radiating unit, and a feed unit. The substrate has a first direction and a second direction that is not parallel to the first direction. The floating radiating unit and the low-frequency radiating unit are each disposed on the substrate. The floating radiating unit is spaced apart from the low-frequency radiating unit along the first direction, and the floating radiating unit and the low-frequency radiating unit jointly have a common side in the second direction. The feed unit is disposed on the substrate, and is located on the common side. The feed unit is spaced apart from the floating radiating unit and the low-frequency radiating unit along the second direction. A projection path of the feed unit along the second direction passes through the floating radiating unit and the low-frequency radiating unit, and the feed unit is configured to be coupled with each of the floating radiating unit and the low-frequency radiating unit.

In one of the possible or preferred embodiments, the feed unit has a first portion and a second portion along the first direction. The first portion corresponds in position to the floating radiating unit, and the second portion corresponds in position to the low-frequency radiating unit. The first portion has a first length along the first direction, the second portion has a second length along the first direction, and the first length is less than the second length.

In one of the possible or preferred embodiments, a ratio of the first length to the second length is 3:7.

In one of the possible or preferred embodiments, a first separation distance between the first portion and the floating radiating unit is greater than a second separation distance between the second portion and the low-frequency radiating unit.

In one of the possible or preferred embodiments, the antenna module includes a ground unit disposed on the substrate. A projection path of the ground unit along the second direction is configured to pass through the floating radiating unit.

In one of the possible or preferred embodiments, the antenna module includes a control unit electrically coupled to the low-frequency radiating unit. The control unit includes a proximity sensing circuit and a regulating circuit, the proximity sensing circuit has a shared capacitor, and the regulating circuit is electrically coupled to the proximity sensing circuit through the shared capacitor.

In one of the possible or preferred embodiments, a frequency emitted by the low-frequency radiating unit through the control unit is within a range from 617 MHz to 960 MHz.

In order to solve the above-mentioned problems, another one of the technical aspects adopted by the present disclosure is to provide an electronic device that includes the aforementioned antenna module.

Therefore, in the antenna module and the electronic device provided by the present disclosure, by virtue of "the floating radiating unit being spaced apart from the low-frequency radiating unit along the first direction, and the feed unit being spaced apart from the floating radiating unit and the low-frequency radiating unit along the second direction" and "a projection path of the feed unit along the second direction being configured to pass through the floating radiating unit and the low-frequency radiating unit, and the feed unit being configured to be coupled with each of the floating radiating unit and the low-frequency radiating unit," the antenna module and the electronic device can avoid unexpected changes in the characteristics of a mid-frequency band when switching to a low-frequency band.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
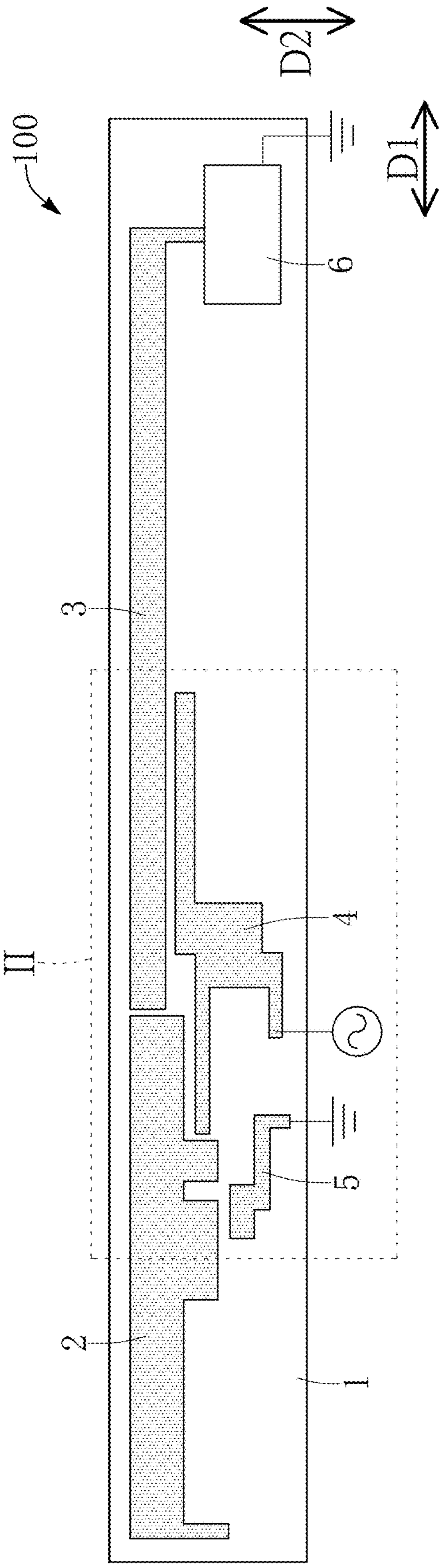
FIG. 1 is a schematic planar view of an antenna module according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 9, the present disclosure provides an antenna module 100. As shown in FIG. 1, the antenna module 100 includes a substrate 1, and a floating radiating unit 2, a low-frequency radiating unit 3, and a feed unit 4 that are disposed on the substrate 1. The following description describes the structure and connection relationship of each component of the antenna module 100.

As shown in FIG. 1, the substrate 1 is made of an insulating material, and the substrate 1 has a first direction D1 and a second direction D2 that is not parallel to the first direction D1. In practice, the first direction D1 may be a length extension direction of the substrate 1, and the second direction D2 may be a width extension direction of the substrate 1. The first direction D1 and the second direction D2 in the present embodiment are perpendicular to each other, but the present disclosure is not limited thereto. For example, in certain embodiments of the present disclosure (not shown in the figures), the first direction D1 and the second direction D2 may have an included angle that is less than (or greater than) 90 degrees.

Figure 3:
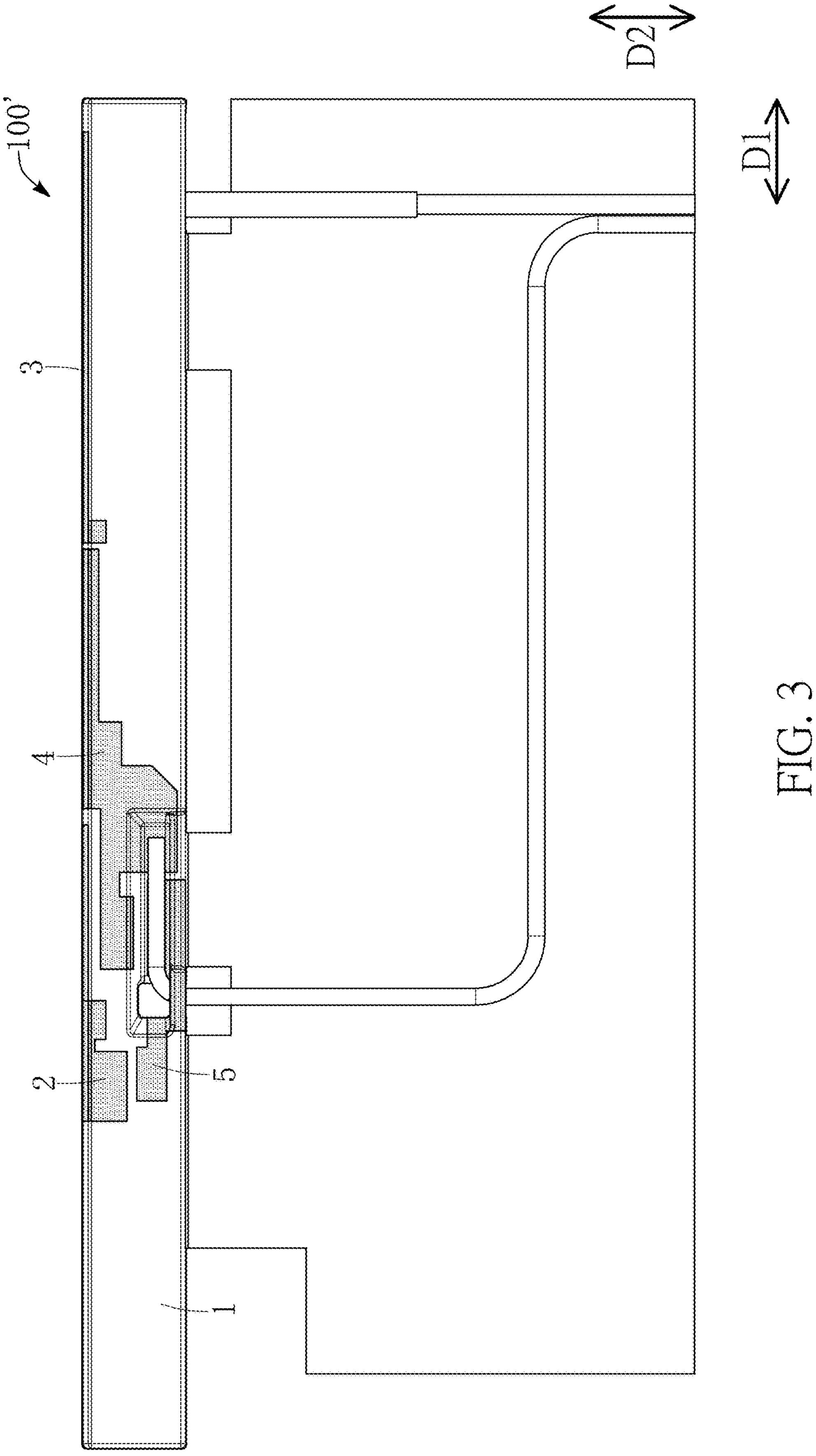
FIG. 3 is a schematic side view of the antenna module according to one embodiment of the present disclosure.
Figure 4:
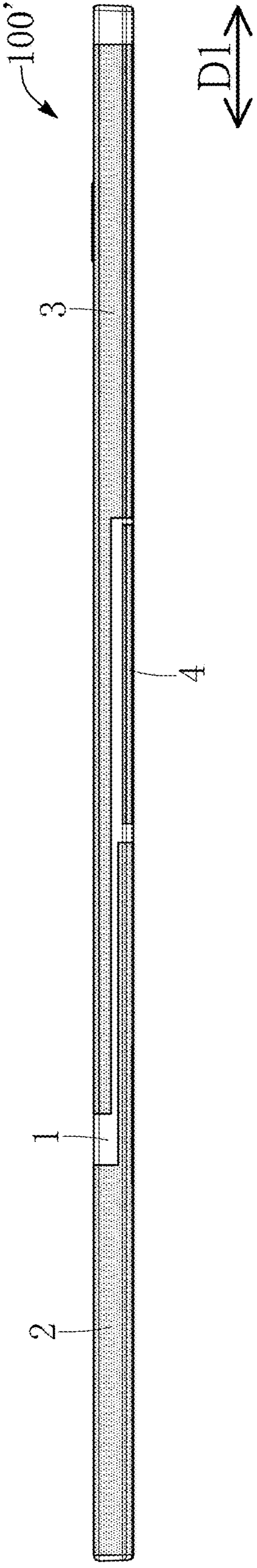
FIG. 4 is a schematic top view of the antenna module according to one embodiment of the present disclosure.
Figure 5:
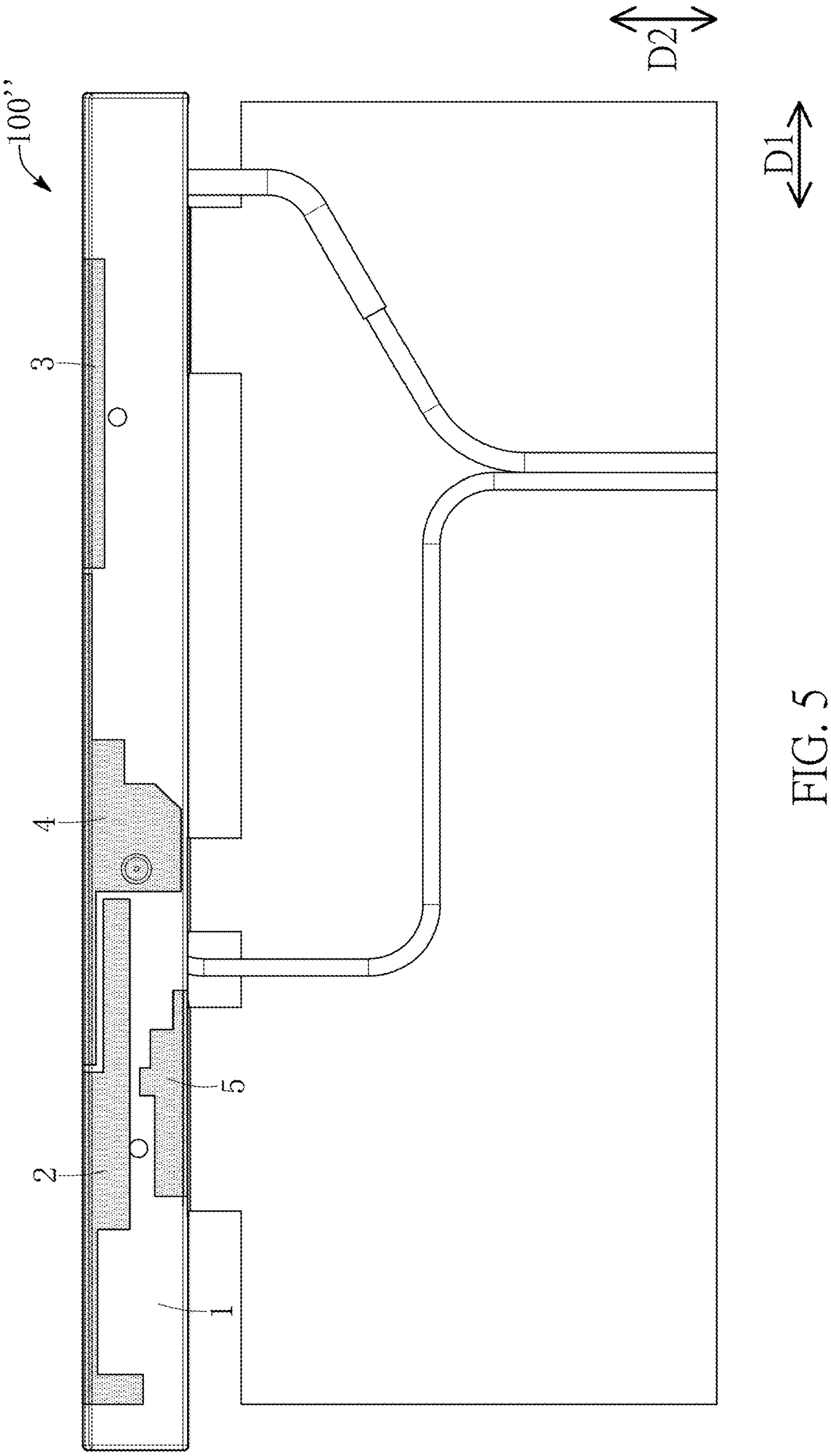
FIG. 5 is a schematic side view of the antenna module according to another embodiment of the present disclosure.
Figure 6:
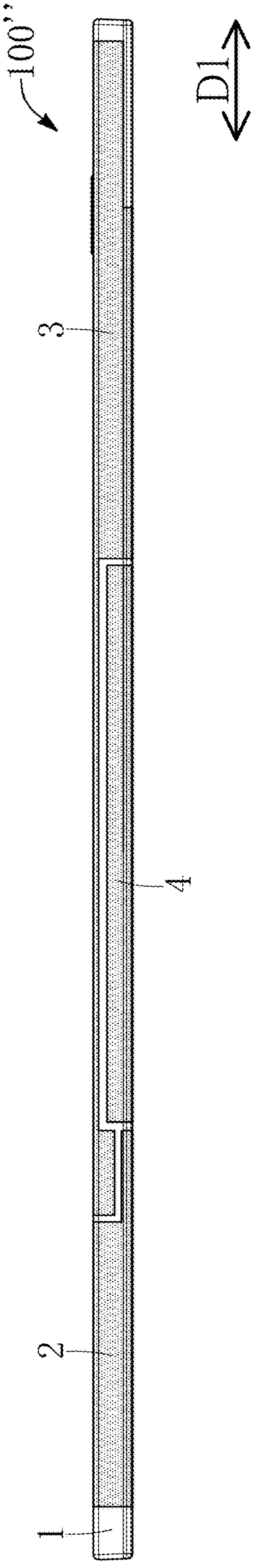
FIG. 6 is a schematic top view of the antenna module according to another embodiment of the present disclosure.

It should be noted that, in practice, the substrate 1 can be adjusted to have a three-dimensional structure (e.g., the substrate 1 has a curved surface or a plate body) according to application requirements of an electronic device, and examples thereof include an antenna module 100' of one embodiment as shown in FIG. 3 and FIG. 4, or an antenna module 100" of another embodiment as shown in FIG. 5 and FIG. 6. For ease of illustration, the antenna module 100 of the present disclosure is illustrated in a flat state (i.e., the substrate 1 has a sheet structure), but the present disclosure is not limited thereto.

Figure 2:
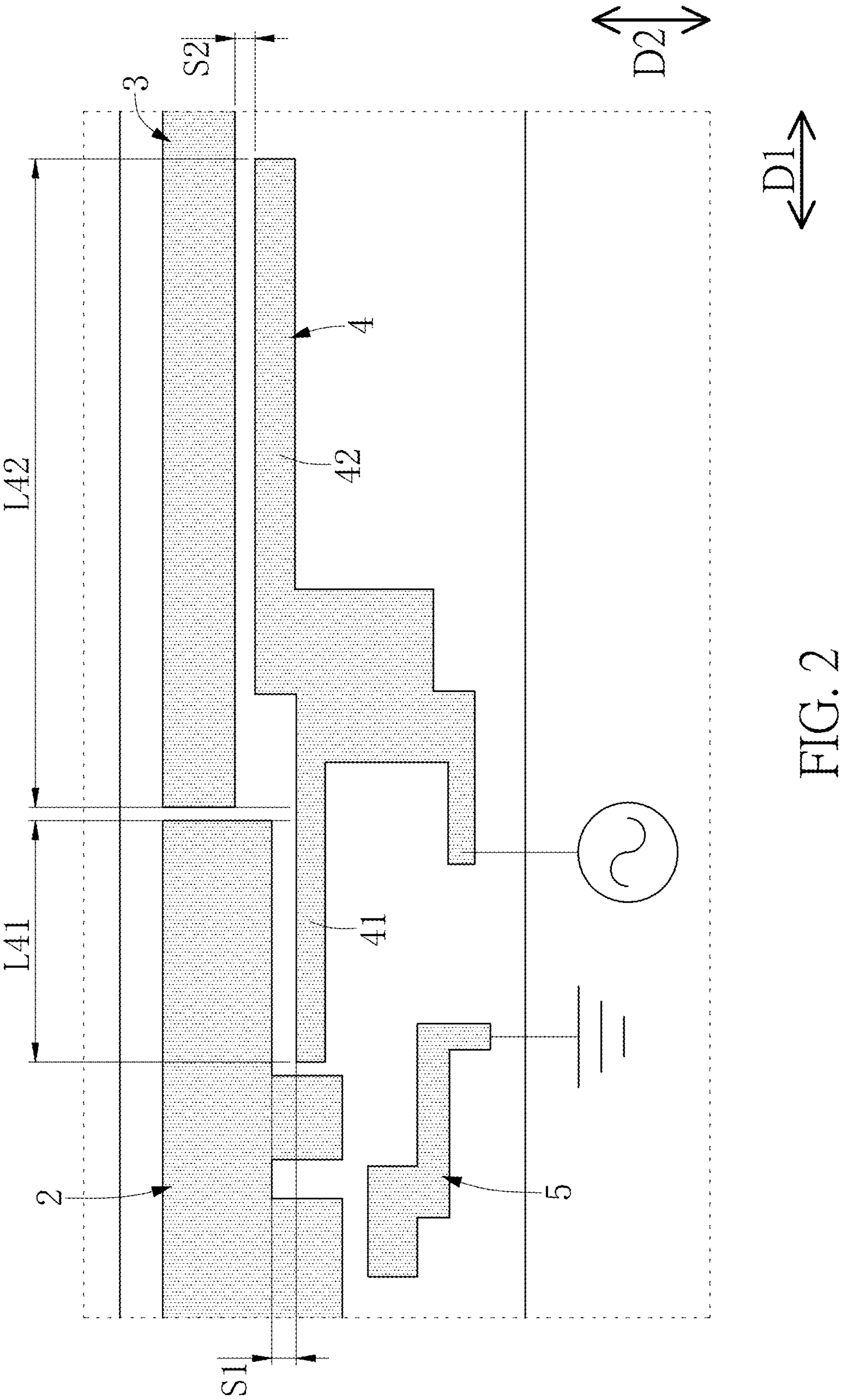
FIG. 2 is a schematic enlarged view of section II of FIG. 1.

Referring to FIG. 1 and FIG. 2, each of the floating radiating unit 2, the low-frequency radiating unit 3, and the feed unit 4 in the present embodiment is a sheet-shaped conductive metal, and the floating radiating unit 2, the low-frequency radiating unit 3, and the feed unit 4 can be disposed on the substrate 1 in a bending manner according to the shape of the substrate 1 (as shown in FIG. 3 to FIG. 6). For ease of understanding, the floating radiating unit 2, the low-frequency radiating unit 3, and the feed unit 4 are described below in a flat state. That is, the floating radiating unit 2, the low-frequency radiating unit 3, and the feed unit 4 are spread out (as shown in FIG. 1 and FIG. 2).

Specifically, each of the floating radiating unit 2 and the low-frequency radiating unit 3 is an elongated structure along the first direction D1. The floating radiating unit 2 is disposed on the substrate 1, and is spaced apart from the low-frequency radiating unit 3 along the first direction D1. The floating radiating unit 2 and the low-frequency radiating unit 3 jointly have a common side in the second direction D2.

In addition, the feed unit 4 is disposed on the substrate 1, and is located on the common side. The feed unit 4 is spaced apart from the floating radiating unit 2 and the low-frequency radiating unit 3 along the second direction D2. The feed unit 4 is located across the floating radiating unit 2 and the low-frequency radiating unit 3.

In other words, a projection path of the feed unit 4 along the second direction D2 (e.g., from bottom to top of the paper in FIG. 2) can pass through the floating radiating unit 2 and the low-frequency radiating unit 3. Accordingly, the feed unit 4 can be coupled with the floating radiating unit 2 and the low-frequency radiating unit 3 at the same time.

It is worth noting that, in order to more effectively avoid unexpected changes in the characteristics of a mid-frequency, a length of a part of the feed unit 4 that corresponds in position to the floating radiating unit 2 is preferably less than a length of a part of the feed unit 4 that corresponds in position to the low-frequency radiating unit 3.

In detail, the feed unit 4 has a first portion 41 and a second portion 42 along the first direction D1, the first portion 41 corresponds in position to the floating radiating unit 2, and the second portion 42 corresponds in position to the low-frequency radiating unit 3. The first portion 41 has a first length L41 along the first direction D1, the second portion 42 has a second length L42 along the first direction D1, and the first length L41 is less than the second length L42. Preferably, a ratio of the first length L41 to the second length L42 may be 4:6, but the present disclosure is not limited thereto. For example, the ratio of the first length L41 to the second length L42 may be 3:7.

Moreover, when the length of the part of the feed unit 4 that corresponds in position to the floating radiating unit 2 is less than the length of the part of the feed unit 4 that corresponds in position to the low-frequency radiating unit 3, a separation distance between the first portion 41 and the floating radiating unit 2 and a separation distance between the second portion 42 and the low-frequency radiating unit 3 may be unequal, so as to perform matching adjustment of an antenna resonance mode. Specifically, a first separation distance S1 is defined between the first portion 41 and the floating radiating unit 2, a second separation distance S2 is defined between the second portion 42 and the low-frequency radiating unit 3, and a relationship between the first separation distance S1 and the second separation distance S2 is opposite to a relationship between the first length L41 and the second length L42. In other words, the first separation distance S1 is greater than the second separation distance S2.

In one embodiment, the antenna module 100 further includes a ground unit 5, and the ground unit 5 is disposed on the substrate 1. A projection path of the ground unit 5 along the second direction D2 (e.g., from bottom to top of the paper in FIG. 2) can pass through the floating radiating unit 2, and a projection path of the ground unit 5 along the first direction D1 (e.g., from left to right of the paper in FIG.

2) can pass through the feed unit 4. That is to say, the ground unit 5 is located on the common side of the feed unit 4 and the floating radiating unit 2.

In addition, in another embodiment, the antenna module 100 further includes a control unit 6 electrically coupled to the low-frequency radiating unit 3, and the low-frequency radiating unit 3 can emit a frequency that is within a range from 617 MHz to 960 MHz through the control unit 6. The control unit 6 includes a proximity sensing circuit 61 and a regulating circuit 62. The proximity sensing circuit 61 has a shared capacitor S, and the regulating circuit 62 is electrically coupled to the proximity sensing circuit 61 through the shared capacitor S.

Figure 7:
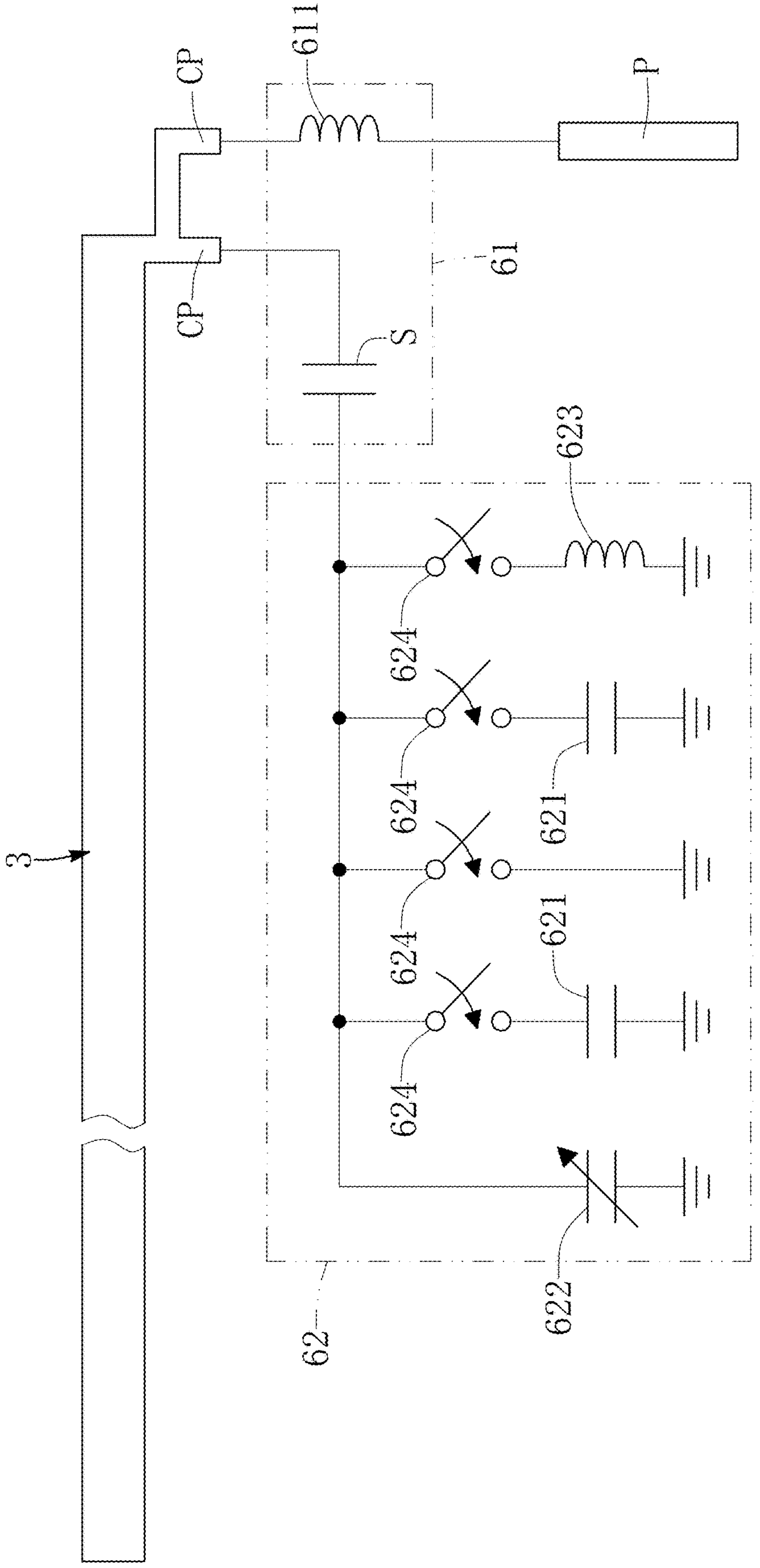
FIG. 7 is a schematic view of a control unit according to one embodiment of the present disclosure.
Figure 8:
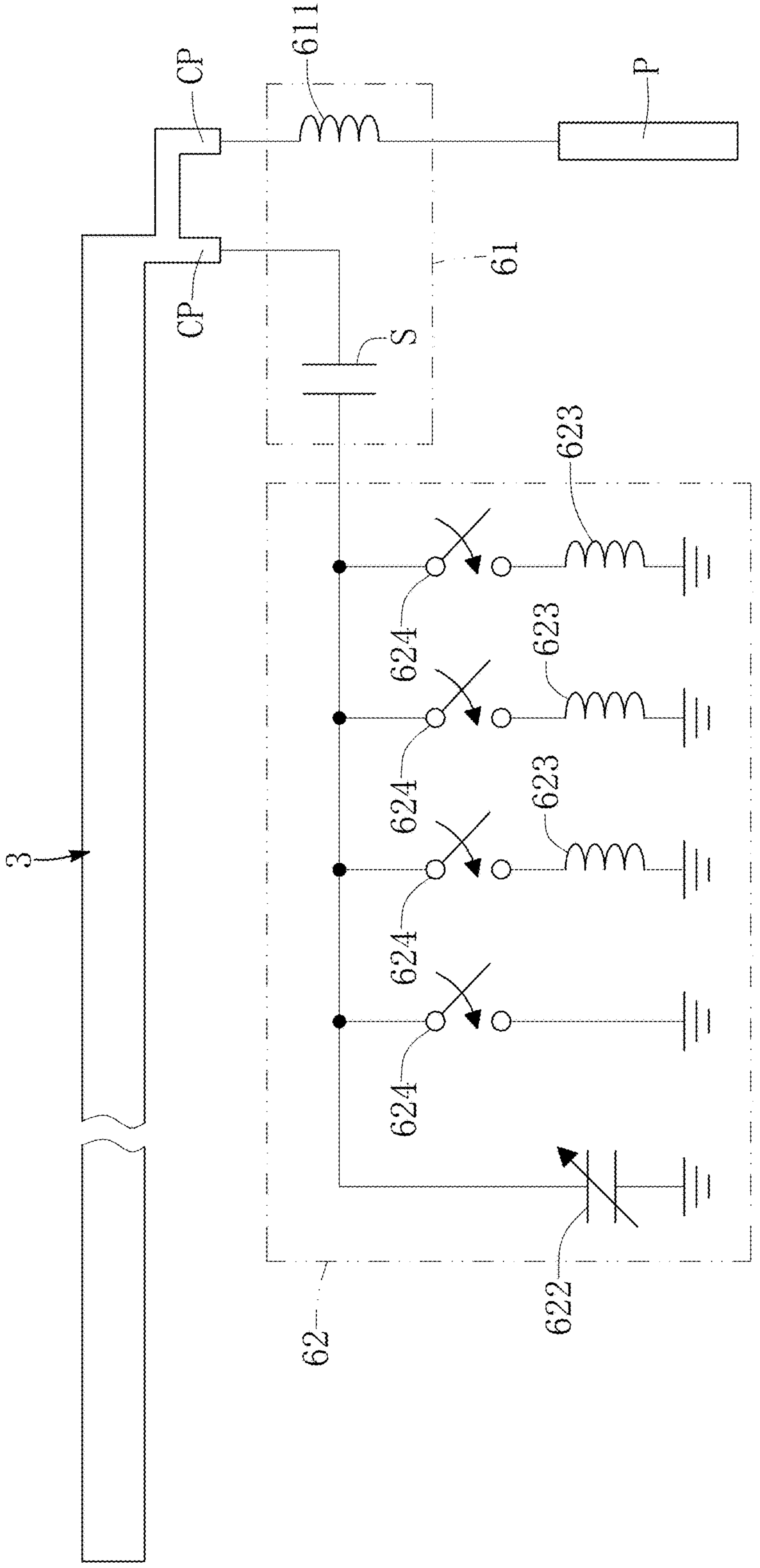
FIG. 8 is a schematic view of the control unit according to another embodiment of the present disclosure.

Specifically, as shown in FIG. 1, FIG. 7, and FIG. 8, the low-frequency radiating unit 3 has two contacts CP that are located at one end of the low-frequency radiating unit 3 away from the floating radiating unit 2. The proximity sensing circuit 61 further includes a (series-connected) radio frequency choke 611. The radio frequency choke 611 is electrically coupled to one of the two contacts CP for being further connected to a P-sensor module P. In this way, an open circuit state is formed between an antenna signal and the P-sensor module P, so as to isolate antenna signal interference. In addition, the shared capacitor S of the proximity sensing circuit 61 is electrically coupled to another one of the two contact points CP, and the shared capacitor S is connected in series to the regulating circuit 62. The configuration of the regulating circuit 62 is not limited in the present embodiment. In one example, as shown in FIG. 7, the regulating circuit 62 may include a plurality of capacitors 621, a variable capacitor 622, and an inductor 623 that are connected to the ground, and a plurality of switches 624 that are connected to the capacitors 621 and the inductor 623, so as to realize the adjustment purpose of low-frequency switching. In another example, as shown in FIG. 8, the regulating circuit 62 may include a plurality of inductors 623 and a variable capacitor 622 that are connected to the ground, and a plurality of switches 624 that are connected to the inductors 623, so as to realize the adjustment purpose of low-frequency switching.

Accordingly, in the antenna module 100 provided by the present disclosure, by virtue of "the regulating circuit 62 being electrically coupled to the proximity sensing circuit 61 through the shared capacitor S," the regulating circuit 62 and the proximity sensing circuit 61 share the shared capacitor S. Therefore, the antenna module 100 of the present disclosure has the functions of adjustment and sensing (i.e., a P-sensor and a tuner), and can save more capacitance as compared with a conventional planar inverted-F antenna (i.e., PIFA) architecture, thereby further reducing the manufacturing processes and increasing the usable space on the substrate 1.

Figure 9:
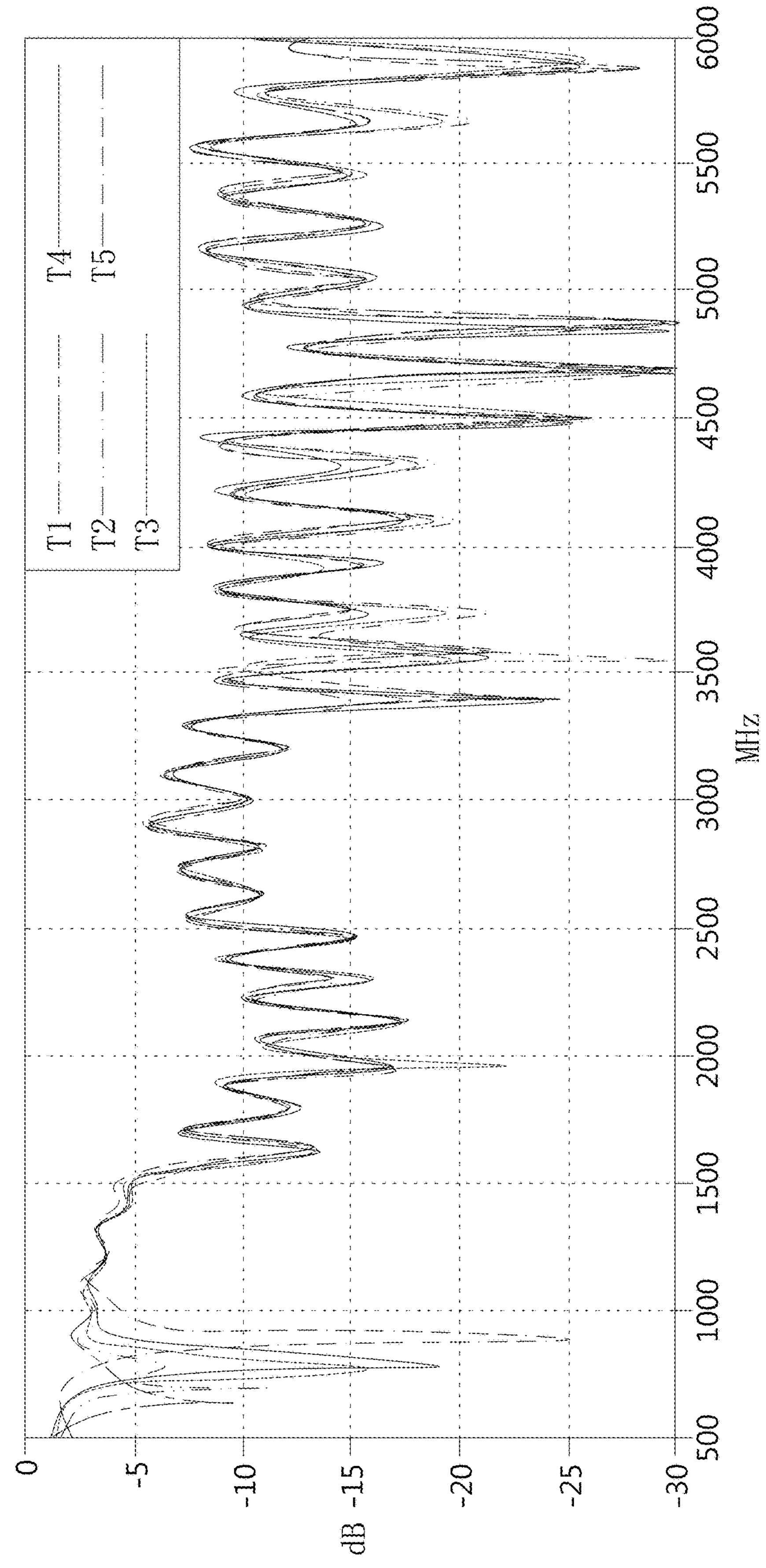
FIG. 9 is a schematic curve diagram of a reflection loss of the antenna module through different paths according to the present disclosure.

Referring to FIG. 9, a curve in FIG. 9 is a schematic diagram illustrating a reflection loss of the antenna module 100 through different paths. Specifically, the antenna module 100 in a low-frequency band can switch to a first mode, a second mode, a third mode, a fourth mode, and a fifth mode. When the antenna module 100 is in the first mode, the antenna module 100 can generate a first operating frequency band T1 through the floating radiating unit 2, the low-frequency radiating unit 3, and the feed unit 4. When the antenna module 100 is in the second mode, the antenna module 100 can generate a second operating frequency band T2 through the floating radiating unit 2, the low-frequency radiating unit 3, and the feed unit 4. When the antenna module 100 is in the third mode, the antenna module 100 can generate a third operating frequency band T3 through the floating radiating unit 2, the low-frequency radiating unit 3, and the feed unit 4. When the antenna module 100 is in the fourth mode, the antenna module 100 can generate a fourth operating frequency band T4 through the floating radiating unit 2, the low-frequency radiating unit 3, and the feed unit 4. When the antenna module 100 is in the fifth mode, the antenna module 100 can generate a fifth operating frequency band T5 through the floating radiating unit 2, the low-frequency radiating unit 3, and the feed unit 4.

A center frequency of the first operating frequency band T1, a center frequency of the second operating frequency band T2, a center frequency of the third operating frequency band T3, a center frequency of the fourth operating frequency band T4, and a center frequency of the fifth operating frequency band T5 may be different from each other. For example, the first operating frequency band T1 is B71 in the wireless wide area network (WWAN) frequency band, the second operating frequency band T2 is B12, B17, B29, and B85 in the WWAN frequency band, the third operating frequency band T3 is B13, B14, and B28 in the WWAN frequency band, the fourth operating frequency band T4 is B5, B6, B18, B19, B20, B26, B27, n91, and n92 in the WWAN frequency band, and the fifth operating frequency band T5 is n93, n94, and B8 in the WWAN frequency band.

In addition, it can be observed from FIG. 9 that the first operating frequency band T1, the second operating frequency band T2, the third operating frequency band T3, the fourth operating frequency band T4, and the fifth operating frequency band T5 substantially overlap with one another in a mid-frequency band. (e.g., within a range from 1,400 MHz to 6,000 MHz). That is to say, the antenna module 100 and the electronic device can ensure maintenance of the characteristics of the mid-frequency band when switching to the low-frequency band. In other words, when a conventional antenna module is switched to the low-frequency band, a frequency in the mid-frequency band will shift and affect the characteristics thereof.

Figure 10:
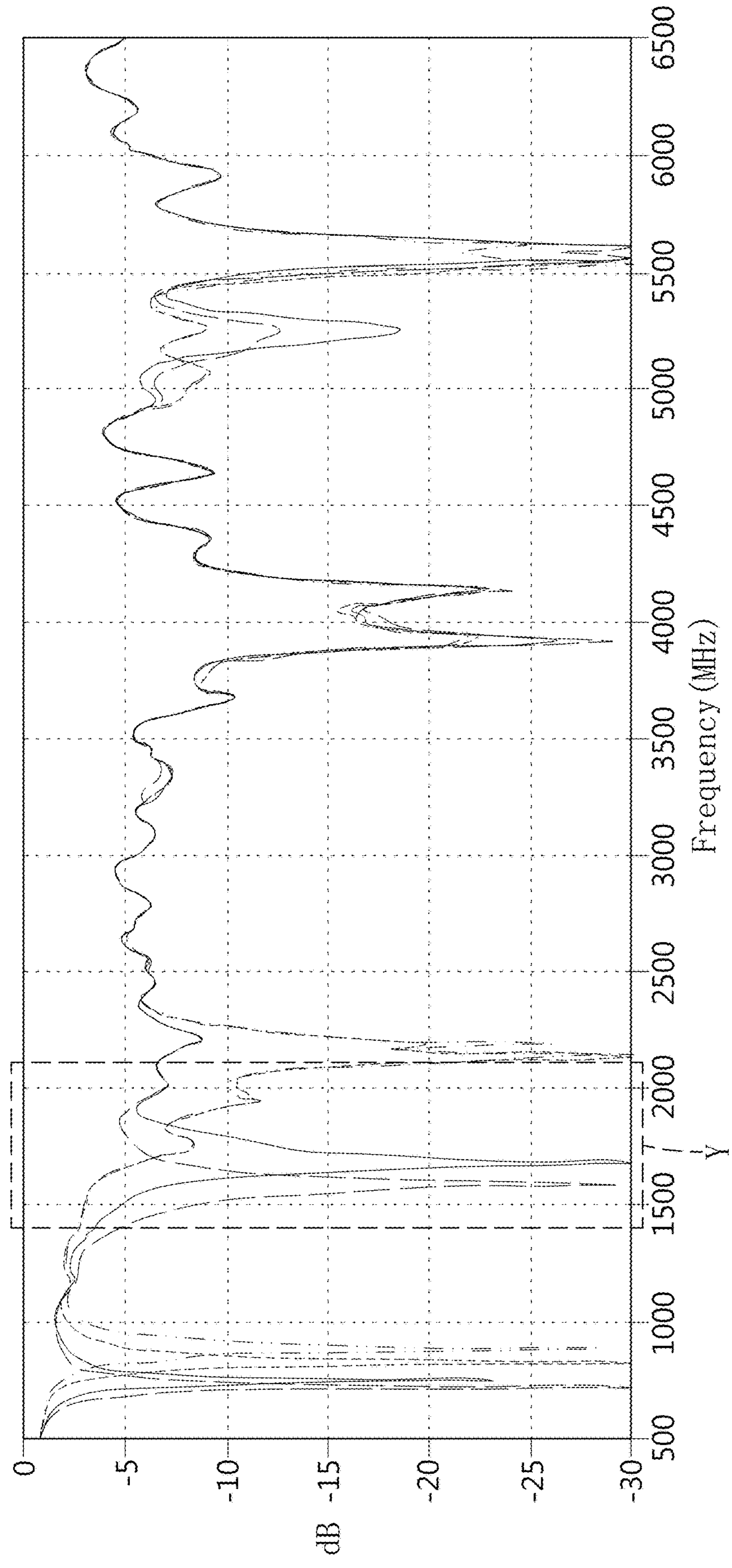
FIG. 10 RELATED ART
FIG. 10 is a schematic curve diagram of a reflection loss measured by a conventional antenna module.

For example, FIG. 10 is a schematic curve diagram of a reflection loss measured by a conventional antenna module. From a mid-frequency band area Y in FIG. 10, it can be observed that a plurality of curves in the aforementioned mid-frequency band area Y generally do not completely overlap with one another. Furthermore, it can be observed from FIG. 9 that the antenna module 100 of the present disclosure can perform better than a conventional PIFA coupling antenna in the low-frequency band.

Beneficial Effects of the Embodiments

In conclusion, in the antenna module and the electronic device provided by the present disclosure, by virtue of "the floating radiating unit being spaced apart from the low-frequency radiating unit along the first direction, and the feed unit being spaced apart from the floating radiating unit and the low-frequency radiating unit along the second direction" and "a projection path of the feed unit along the second direction being configured to pass through the floating radiating unit and the low-frequency radiating unit, and the feed unit being configured to be coupled with each of the floating radiating unit and the low-frequency radiating unit," the antenna module and the electronic device can avoid unexpected changes in the characteristics of a mid-frequency band when switching to a low-frequency band.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna module, comprising:

a substrate having a first direction and a second direction that is not parallel to the first direction;

a floating radiating unit and a low-frequency radiating unit, wherein the floating radiating unit and the low-frequency radiating unit are each disposed on the substrate, the floating radiating unit is spaced apart from the low-frequency radiating unit along the first direction, and the floating radiating unit and the low-frequency radiating unit jointly have a common side in the second direction;

a feed unit disposed on the substrate and located on the common side, wherein the feed unit is spaced apart from the floating radiating unit and the low-frequency radiating unit along the second direction, and wherein a projection path of the feed unit along the second direction passes through the floating radiating unit and the low-frequency radiating unit, and the feed unit is configured to be coupled with each of the floating radiating unit and the low-frequency radiating unit; and a control unit electrically coupled to the low-frequency radiating unit, wherein the control unit includes a proximity sensing circuit and a regulating circuit, the proximity sensing circuit has a shared capacitor, and the regulating circuit is electrically coupled to the proximity sensing circuit through the shared capacitor.

2. The antenna module according to claim 1, wherein the feed unit has a first portion and a second portion along the first direction; wherein the first portion corresponds in position to the floating radiating unit, and the second portion corresponds in position to the low-frequency radiating unit; wherein the first portion has a first length along the first direction, the second portion has a second length along the first direction, and the first length is less than the second length.

3. The antenna module according to claim 2, wherein a ratio of the first length to the second length is 3:7.

4. The antenna module according to claim 2, wherein a first separation distance between the first portion and the floating radiating unit is greater than a second separation distance between the second portion and the low-frequency radiating unit.

5. The antenna module according to claim 1, further comprising a ground unit disposed on the substrate; wherein a projection path of the ground unit along the second direction is configured to pass through the floating radiating unit.

6. The antenna module according to claim 1, wherein a frequency emitted by the low-frequency radiating unit through the control unit is within a range from 617 MHz to 960 MHz.

7. An electronic device comprising the antenna module as claimed in claim 1.

8. An electronic device comprising the antenna module as claimed in claim 5.

* * * * *